US012545030B2

(12) United States Patent
Kimoto

(10) Patent No.: US 12,545,030 B2
(45) Date of Patent: Feb. 10, 2026

(54) LIQUID DISCHARGE APPARATUS

(71) Applicant: BROTHER KOGYO KABUSHIKI KAISHA, Nagoya (JP)

(72) Inventor: Taichiro Kimoto, Nagoya (JP)

(73) Assignee: Brother Koygo Kabushiki Kaisha, Nagoya (JP)

( * ) Notice: Subject to any disclaimer, the term of this patent is extended or adjusted under 35 U.S.C. 154(b) by 137 days.

(21) Appl. No.: 18/449,064

(22) Filed: Aug. 14, 2023

(65) Prior Publication Data

US 2024/0059068 A1 Feb. 22, 2024

(30) Foreign Application Priority Data

Aug. 18, 2022 (JP) ................................ 2022-130569

(51) Int. Cl.
*B41J 2/165* (2006.01)

(52) U.S. Cl.
CPC ....... *B41J 2/16579* (2013.01); *B41J 2/16523* (2013.01); *B41J 2/16511* (2013.01)

(58) Field of Classification Search
CPC ........................ B41J 2/16579; B41J 2/16523; B41J 2/16508; B41J 2/1721; B41J 2/185
See application file for complete search history.

(56) References Cited

U.S. PATENT DOCUMENTS

2012/0229552 A1* 9/2012 Sugahara ................. B41J 2/125
347/19
2020/0108616 A1* 4/2020 Nakagawa ........... B41J 2/16588

FOREIGN PATENT DOCUMENTS

JP 2005-288872 A 10/2005
JP 2022113260 A * 8/2022 ............ B41J 2/0451

* cited by examiner

*Primary Examiner* — Sharon Polk
(74) *Attorney, Agent, or Firm* — Scully, Scott, Murphy & Presser, P.C.

(57) ABSTRACT

There is provided a liquid discharge apparatus including: a head including a nozzle configured to discharge a liquid, an instruction-input section configured to accept an instruction from the user, and a controller. The controller is configured to execute: determining whether an instruction input from the instruction-input section is an instruction to execute a first recovery process in which a liquid consumption is greater than a first threshold amount; determining whether an execution condition for the first recovery process is met, in response that the instruction input from the instruction-input section is the instruction to execute the first recovery process; executing the first recovery process, in response that the execution condition for the first recovery process is met; and skipping the first recovery process, in response that the execution condition for the first recovery process is not met.

10 Claims, 11 Drawing Sheets

LIQUID DISCHARGE APPARATUS

REFERENCE TO RELATED APPLICATIONS

This application claims priority from Japanese Patent Application No. 2022-130569 filed on Aug. 18, 2022. The entire content of the priority application is incorporated herein by reference.

BACKGROUND ART

A publicly known printer includes a head having nozzles for ejecting ink. The publicly known printer executes a recovery process of the head to eliminate ink discharge failure from the nozzle (hereinafter referred to as discharge failure of a head). The printer executes the recovery process of the head when, for example, a user instructs the printer to execute the recovery process.

DESCRIPTION

There are several types of recovery processes in printers with different intensities of the recovery operations. The strong recovery process has the advantage of being more effective in eliminating head discharge failure, but it also has the disadvantage of consuming a large amount of ink in the recovery process. On the other hand, the weak recovery process has the advantage of consuming a small amount of ink in the recovery process, but has the disadvantage of being less effective in eliminating head discharge failure.

When a head discharge failure occurs, the user of the printer may repeatedly instruct the printer to execute a strong recovery process without considering the amount of ink consumed in the recovery process in order to quickly eliminate the discharge failure. If the printer repeatedly executes the strong recovery process according to the user's instruction, more ink than necessary is consumed in the recovery process.

The present disclosure was made in view of the above circumstances, and its purpose is to provide a means by which an amount of liquid consumed in the head recovery process can be reduced.

According to an aspect of the present disclosure, there is provided a liquid discharge apparatus including a head, an instruction-input section, and a controller. The head includes a nozzle configured to discharge a liquid. The instruction-input section is configured to accept an instruction from a user. The controller is configured to: determine whether an instruction input from the instruction-input section is an instruction to execute a first recovery process in which a liquid consumption is greater than a first threshold; determine whether an execution condition for the first recovery process is met, in response that the instruction input from the instruction-input section is the instruction to execute the first recovery process; execute the first recovery process, in response that the execution condition is met; and skip the first recovery process, in response that the execution condition is not met.

According to the liquid discharge apparatus, even when the user instructs the execution of the first recovery process in which the amount of liquid consumed is greater than the first threshold amount, the first recovery process is not executed if the execution conditions of the first recovery process are not met. Therefore, the execution of the first recovery process can be limited and the amount of liquid consumed in the head recovery process can be reduced.

Embodiments of the present disclosure are described below. It goes without saying that the embodiments described below are only examples of the present disclosure, and that the embodiments of the present disclosure can be changed as necessary to the extent that the gist of the present disclosure is not changed. The up-down direction is defined with respect to the state in which the printer 10 is installed and ready for use (the state depicted in FIG. 1), the front-rear direction is defined with respect to a front surface of the printer 10 with the opening 13 formed, and the left-right direction is defined with respect to the printer 10 viewed from the front surface. The up-down direction, the front-rear direction, and the left-right direction are orthogonal to each other.

[Overview of Printer 10]

The printer 10 is an example of a liquid discharge apparatus that discharges ink (an example of liquid) onto a sheet using an inkjet printing method. The printer 10 is a color printer that discharges cyan, magenta, yellow, and black ink onto a sheet.

Figure 1:
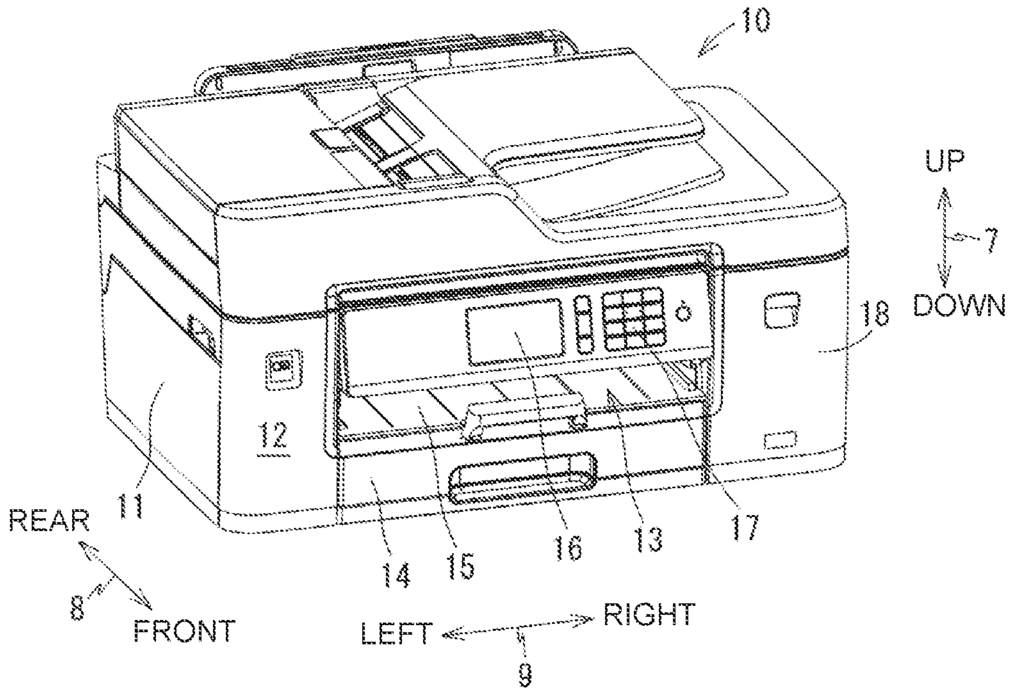
FIG. 1 depicts an external view of a printer 10.
Figure 2:
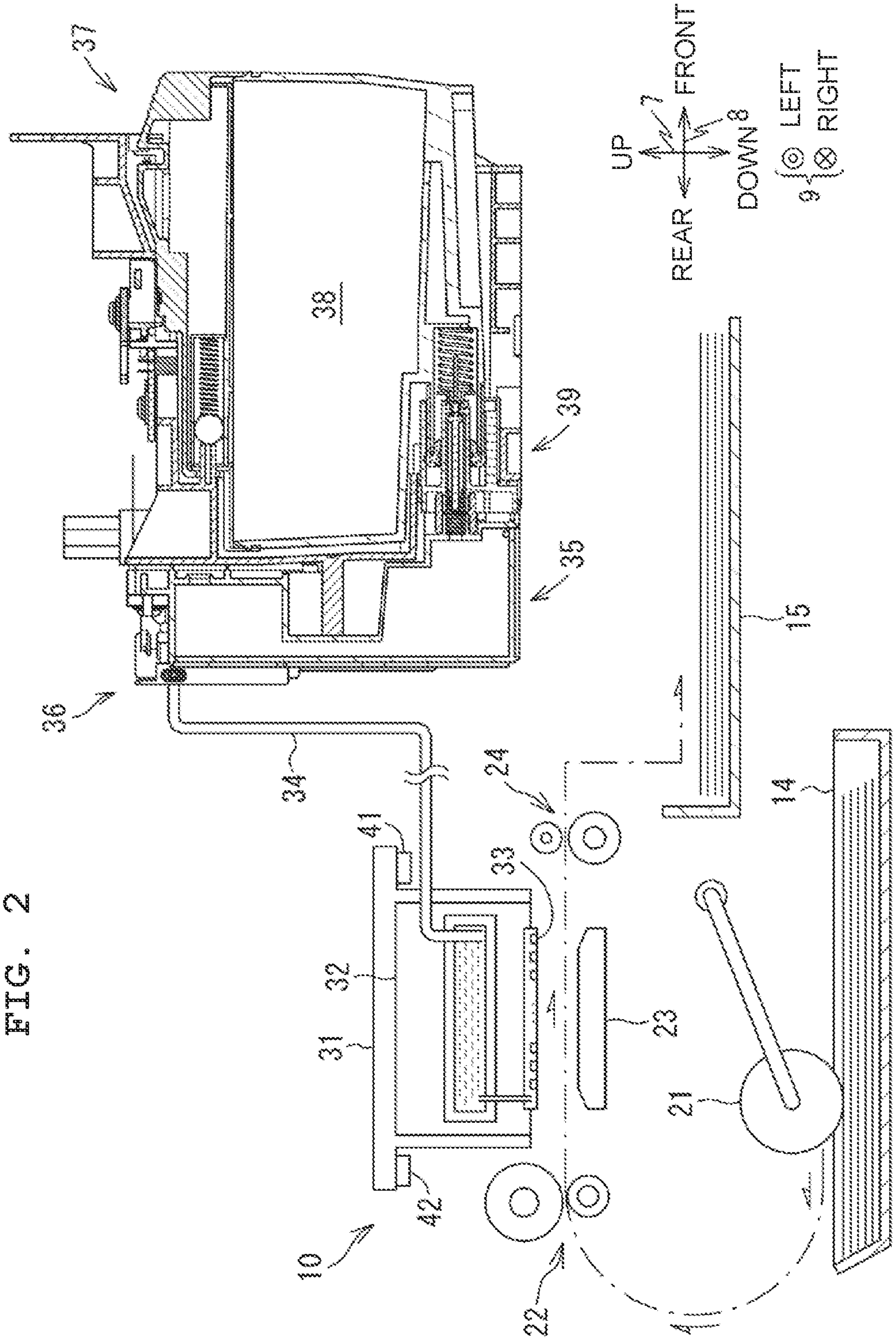
FIG. 2 depicts a longitudinal cross-sectional view of the internal structure of the printer 10.

The printer 10 has a generally rectangular-shaped body 11. As depicted in FIGS. 1 and 2, there are provided, in the body 11, a supply tray 14, a supply roller 21, a conveyance roller 22, a carriage 31, a head 32 mounted on the carriage 31 and having a plurality of nozzles 33, a platen 23 facing the head 32, a discharge roller 24, a discharge tray 15, a sub-tank 35, a case 36 in which a cartridge 37 can be mounted, and a tube 34 that connects the cartridge 37 and the head 32 mounted in the case 36. A plurality of nozzles 33 is aligned in a front-rear direction on a lower surface of the head 32. The tube 34, the sub-tank 35, and the case 36 are depicted one by one in FIG. 2. Actually, the printer 10 has four of each of these elements.

The printer 10 drives the supply roller 21 and the conveyance roller 22 to transport the sheet supported by the supply tray 14 along a conveyance path (the path indicated by the single-dotted line in FIG. 2) to the position of the platen 23. Next, the printer 10 discharges ink, supplied from the cartridge 37 mounted in the case 36 via the sub-tank 35 and the tube 34, from the nozzles 33 of the head 32. This causes the ink to land on the sheet supported by the platen 23, and the image to be formed is printed on the sheet. The printer 10 drives the discharge roller 24 to discharge the sheet with the printed image onto the discharge tray 15.

The carriage 31 is supported by two guide rails 41 and 42 extending in the left-right direction and moves back and forth in the left-right direction. The printer 10 ejects ink from the nozzles 33 of the head 32 while the carriage 31 moves in the left-right direction. This causes an image to be recorded on a portion of the sheet facing the head 32. Next, the printer 10 causes the conveyance roller 22 to convey the sheet so that the area where the image is to be recorded next faces the head 32. By having these processes repeated alternately, an image is recorded on the sheet.

As depicted in FIG. 1, the body 11 is provided with a cover 18 at the front 12 of the body 11 and at the right end in the left-right direction. An opening (not depicted) is formed at the position of the cover 18. The cover 18 can be rotated between a position that closes the opening (the position depicted in FIG. 1) and a position that opens the opening. Four cases 36 are located in the space inside the body 11 that extends behind the opening. The four cases 36 are fitted with the four cartridges 37 containing one of cyan, magenta, yellow, and black ink, respectively.

Each of the cartridges 37 has a chamber 38 (see FIG. 2) that can contain ink. When the cartridge 37 is mounted in the case 36, the ink contained in the chamber 38 flows into the sub-tank 35 via the ink flow channel 39 that connects the chamber 38 and the sub-tank 35. The sub-tank 35 temporarily accommodates the ink that flows into the sub-tank 35. The ink contained in the sub-tank 35 is supplied to the head 32 via the tube 34.

[Moving Range of the Carriage 31]

Figure 3:
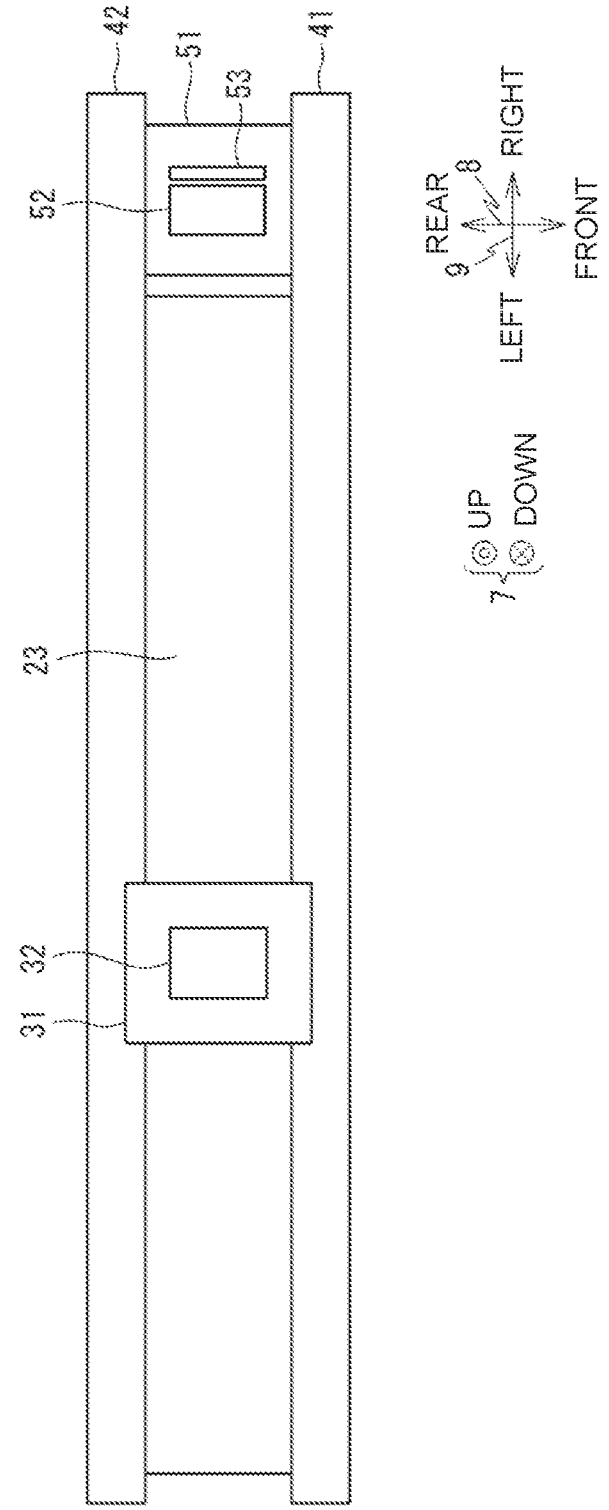
FIG. 3 depicts the range of movement of carriage 31.

As depicted in FIG. 3, the platen 23 is elongated in the left-right direction and is located below carriage 31 in the up-down direction (see FIG. 2). The left end of platen 23 is located near the left end of guide rails 41 and 42 in the left-right direction. The right end of the platen 23 is located to the right of the center of the guide rails 41 and 42 in the left-right direction. The maintenance unit 51 is located to the right of the platen 23 in the left-right direction.

The maintenance unit 51 includes two caps 52 and 53. While the printer 10 is executing printing, the carriage 31 moves in a left-right direction within the range of the platen 23. While the printer 10 is not executing printing, the carriage 31 is positioned at the position where the head 32 faces the caps 52 and 53 (hereinafter referred to as the standby position).

[Controller 60]

Figure 4:
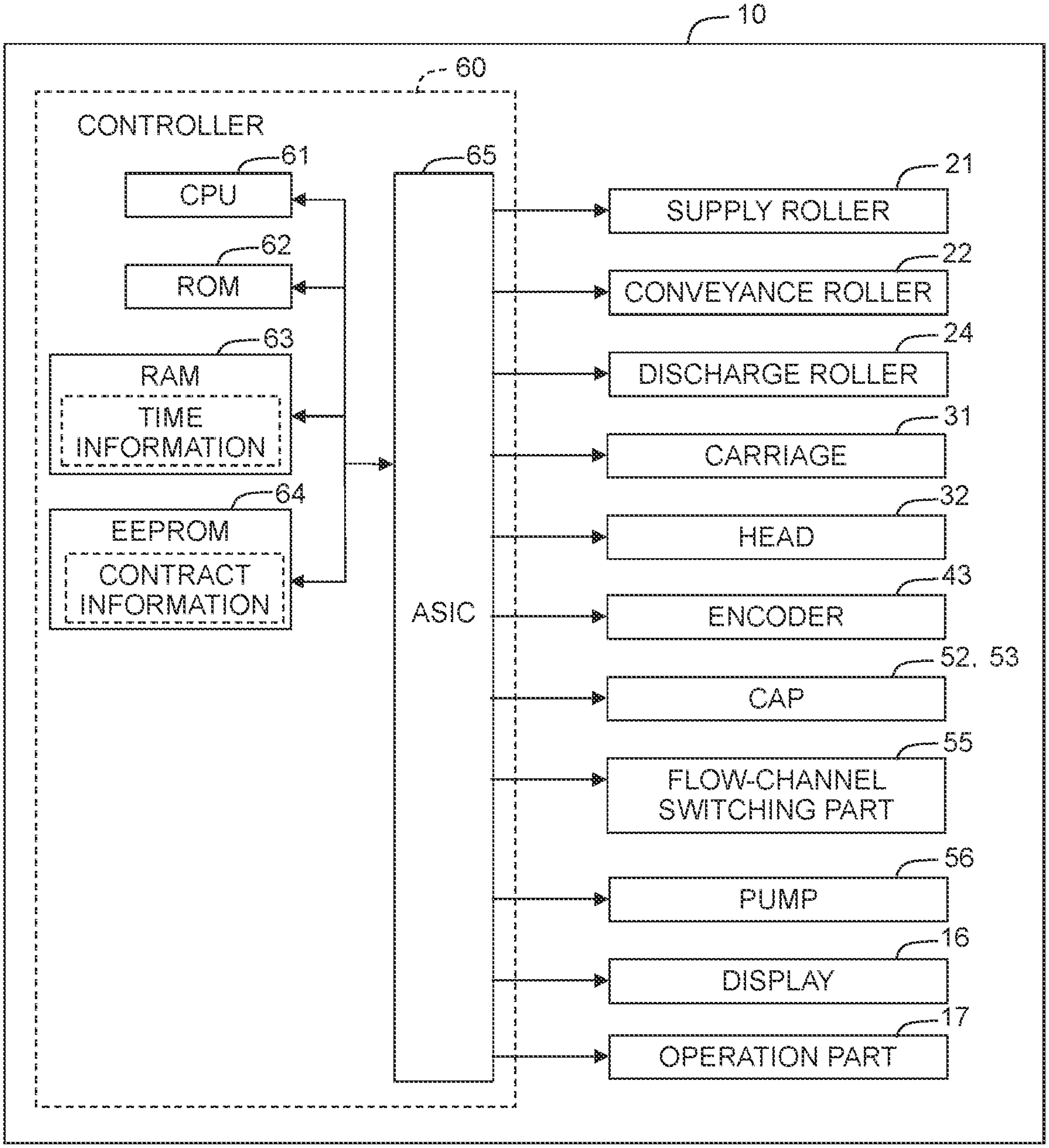
FIG. 4 depicts a block diagram of the printer 10.

The controller 60 depicted in FIG. 4 is located inside the body 11. The controller 60 has a CPU 61, a ROM 62, a RAM 63, an EEPROM 64, and an ASIC 65. The ROM 62 stores programs, etc. for the CPU 61 to execute various processes. The RAM 63 is used as a storage area to temporarily record data and signals used by the CPU 61 to execute programs, or as a work area for data processing. The EEPROM 64 stores information that should be retained after the power is turned off. The RAM 63 and the EEPROM 64 are examples of memory.

The controller 60 controls the supply roller 21, the conveyance roller 22, the discharge roller 24, the carriage 31, and the head 32. The controller 60 drives an unshown motor through the ASIC 65 to rotate the supply roller 21, the conveyance roller 22, and the discharge roller 24. The controller 60 drives an unshown motor through the ASIC 65 to move the carriage 31 in the left-right direction. The controller 60 causes ink to be ejected from the nozzles 33 of the head 32 by outputting drive signals to unshown drive elements of the head 32 through the ASIC 65. The ASIC 65 outputs drive signals according to the amount of ink to be ejected from the nozzles 33.

The output signal of encoder 43 is input to the controller 60 through the ASIC 65. An Encoder 43 is attached to a rotating member included in an unshown moving mechanism of carriage 31 and outputs a signal corresponding to an amount of movement of the carriage 31. The controller 60 determines the position of the carriage 31 based on the output signal of the encoder 43.

The controller 60 controls maintenance unit 51. The controller 60 drives an unshown motor through ASIC 65 to move the caps 52 and 53 independently in the up-down direction. The controller 60 controls the ASIC 65 to output the control signals for switching the state of the flow-channel switching part 55. The controller 60 drives a unshown motor through the ASIC 65 to operate the pump 56. The configuration of the maintenance unit 51 is described below (see FIG. 5).

The ASIC 65 is connected to a display 16 and an operation part 17. The display 16 is, for example, a liquid crystal display, an organic EL display, or the like. The display 16, for example, displays the status of the printer 10 on a screen. The operation part 17 is for inputting instructions from the user. The operation part 17 outputs operation signals to the controller 60 in response to operations by the user. The operation part 17 may have, for example, a push button or a touch sensor superimposed on the display 16.

RAM 63 stores time information indicating the current time. The time information stored in the RAM 63 is reset to an initial value when the printer 10 is turned off. When the printer 10 is turned on, the user sets the current time to the time information stored in the RAM 63 using the operation part 17. The state in which the time information does not indicate the current time is referred to as an Unknown-Current-Time state.

The EEPROM 64 stores contract information. A delivery contract may be entered into between the user of the printer 10 and the manufacturer or distributor of the printer 10, whereby the cartridge 37 is automatically delivered to the user when the amount of ink contained in the cartridge 37 is low. The contract information stored in the EEPROM 64 indicates whether or not the delivery contract for the cartridge 37 has been signed. The contract information stored in the EEPROM 64 is copied to the RAM 63 when the printer 10 is turned on.

[Maintenance Unit 51]

The first to fourth nozzle rows (not depicted) are located on the lower surface of the head 32. In each of the nozzle rows, a plurality of nozzles 33 is aligned in the front-rear direction. The first nozzle row includes a plurality of nozzles 33 for the cyan ink. The second nozzle row includes a plurality of nozzles 33 for the magenta ink. The third nozzle row includes a plurality of nozzles 33 for the yellow ink. The fourth nozzle row includes a plurality of nozzles 33 for the black ink.

Figure 5:
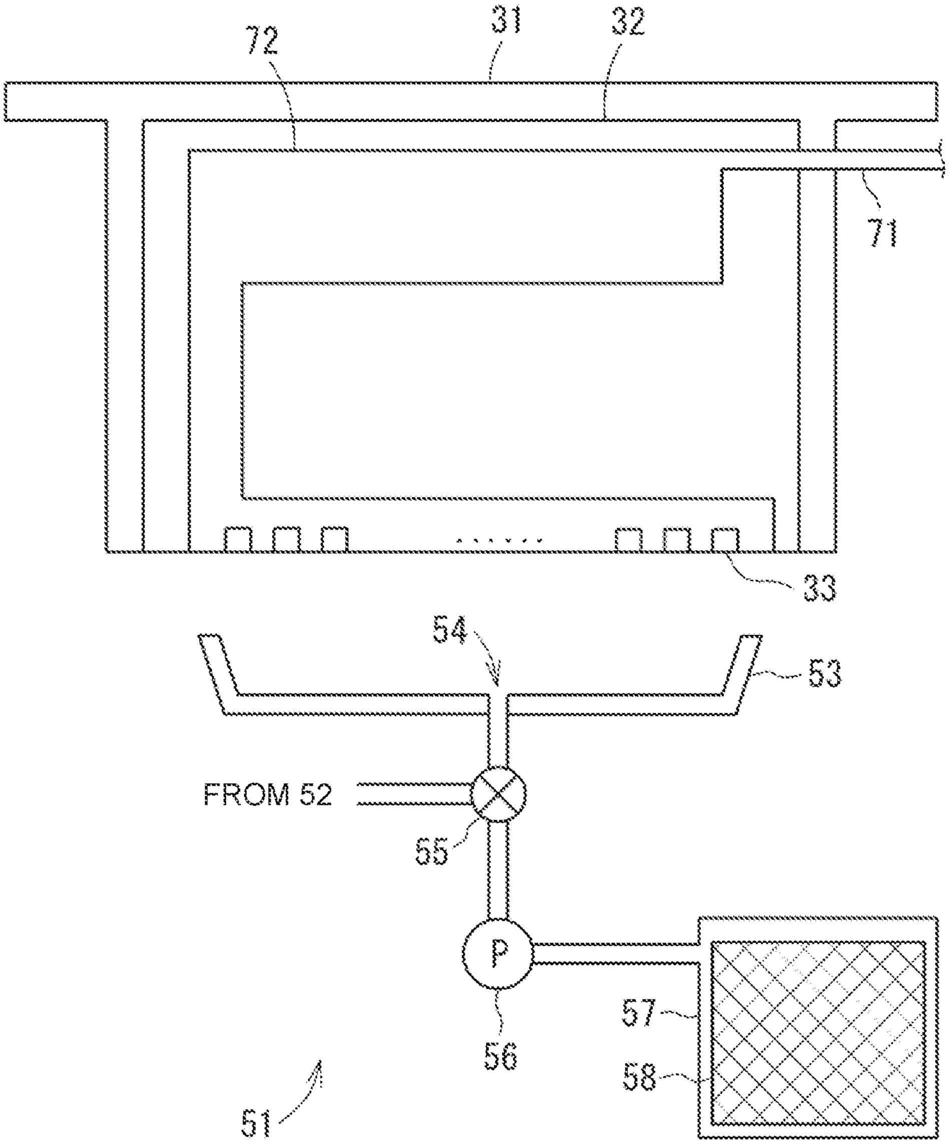
FIG. 5 depicts a schematic diagram of the maintenance unit 51.

FIG. 5 depicts the portion of the head 32 corresponding to the fourth nozzle row and the maintenance unit 51. Inside the head 32, an ink channel 72 is formed connecting an ink inlet 71 to the nozzles 33. When the carriage 31 is located in the standby position, the cap 52 faces the first to third nozzle rows and the cap 53 faces the fourth nozzle row.

The cap 53 is raised and lowered between a position in contact with the lower surface of the head 32 (hereinafter referred to as a capping position) and a position away from the lower surface of the head 32 (hereinafter referred to as an uncapped position), in accordance with control from the controller 60. When the carriage 31 is located in the standby position, the cap 53 is located in the capping position. At this time, the cap 53 contacts the periphery of the fourth nozzle row and covers the fourth nozzle row. When the carriage 31 is located in a position other than the standby position, the cap 53 is located in the uncapped position. At this time, the cap 53 is located downward and away from the periphery of the fourth nozzle row. The bottom of the cap 53 has a discharge port 54.

The cap 52 has the same configuration as the cap 53 and is raised and lowered between the capping and uncapped positions independently of the cap 53 according to the control from the controller 60. When carriage 31 is located in the standby position, the cap 52 is in the capping position and covers the first to third nozzle rows by contacting the surroundings of the first to third nozzle rows. When the carriage 31 is located in a position other than the standby position, the cap 52 is located in the uncapped position. The bottom of the cap 52 has an unshown discharge port.

The inner space of the cap 52 is connected to the first terminal (a left terminal in FIG. 5) of flow-channel switching part 55 via the outlet of cap 52. The inner space of cap 53 is connected to the second terminal (an upper terminal in FIG. 5) of flow-channel switching part 55 via the discharge port 54. The third terminal (lower terminal in FIG. 5) of the flow-channel switching part 55 is connected to one-end of the pump 56. The flow-channel switching part 55 connects one or both of the inner spaces of the caps 52 and 53 to one-end of the pump 56 in accordance with control from the controller 60. The other end of the pump 56 is connected to the waste-liquid tank 57. A waste-liquid foam 58 is located inside the waste-liquid tank 57. The waste-liquid foam 58 absorbs the ink ejected from the head 32 by purge as waste-liquid. The waste-liquid foam 58 is, for example, a sponge.

[Purge]

The controller 60 executes purge by controlling various parts of the maintenance unit 51. Purge is an example of a recovery process of the head 32. Purge performed by the printer 10 is classified into a user purge, which is performed based on instructions from the user, and an automatic purge, which is performed automatically by the printer 10. The user purge is performed in response to the user's instruction to perform the user purge using the operation part 17, or in response to an instruction to perform the user purge transmitted from an external terminal (e.g., computer or cell phone) connected to the printer 10 via the communication interface (not depicted).

When the cap 52 is located in the capping position, the flow-channel switching part 55 connects the inner space of the cap 52 to one-end of the pump 56 and then drives the pump 56. As a result, suction pressure is applied to the ink channels 72 of the first to third nozzle rows from the nozzles 33. As a result, ink and gas in the ink channels 72 of the first to third nozzle rows are discharged from the nozzles 33 in the first to third nozzle rows. The discharged ink is contained in the waste-liquid tank 57 as waste-liquid and absorbed by the waste-liquid foam 58. In this way, purge is executed for the nozzles 33 in the first to third nozzle rows. This purge is hereinafter referred to as "CL purge".

When the cap 53 is located in the capping position, the flow-channel switching part 55 connects the inner space of the cap 53 to one-end of the pump 56 and then drives the pump 56. As a result, suction pressure is applied to the ink channel 72 of the fourth nozzle row from the nozzles 33. As a result, ink and gas in the ink channel 72 of the fourth nozzle row are discharged from the nozzles 33 in the fourth nozzle row. The discharged ink is contained in the waste-liquid tank 57 as the waste-liquid and absorbed by the waste-liquid foam 58. In this way, purge is executed for the nozzles 33 in the fourth nozzle row. This purge is hereinafter referred to as "BK purge".

When both of the caps 52 and 53 are located in the capping position, the flow-channel switching part 55 connects the inner space of the caps 52 and 53 to one-end of the pump 56 and then drives the pump 56. As a result, CL purge and BK purge are performed in parallel.

Hereafter, this purge is referred to as "ALL purge" or "purge with color ALL".

The controller 60 controls the suction force of the pump 56 to the desired strength by controlling the level of the control signal of the pump 56. This allows the controller 60 to selectively perform multiple purges with different suction force intensities. The multiple purges include a user-selectable purge and a user-unselectable purge. In the following description, the intensity of the suction force of the purge is referred to as the purge intensity.

Hereinafter, it is assumed that the controller 60 can selectively perform five different purges P0-P4, of which purges P1-P3 are user-selectable. The smaller the number, the stronger the purge intensity and the more ink is consumed by the purge. The intensity of purge P0 is the strongest among purges P0-P4, and purge P0 consumes the most ink among purges P0-P4. The purge P0 is performed only once during the initial installation of the printer 10. The purge P1 is the strongest among the user purges P1-P3, and the purge P1 consumes the most ink among the user purges P1-P3. The purge P1 is executed when the purges P2 and P3 cannot eliminate the discharge failure of the head 32. Since a lot of ink is consumed when the purge P1 is executed, it is preferable to avoid executing the purge P1 as much as possible.

[Main Process]

Figure 6:
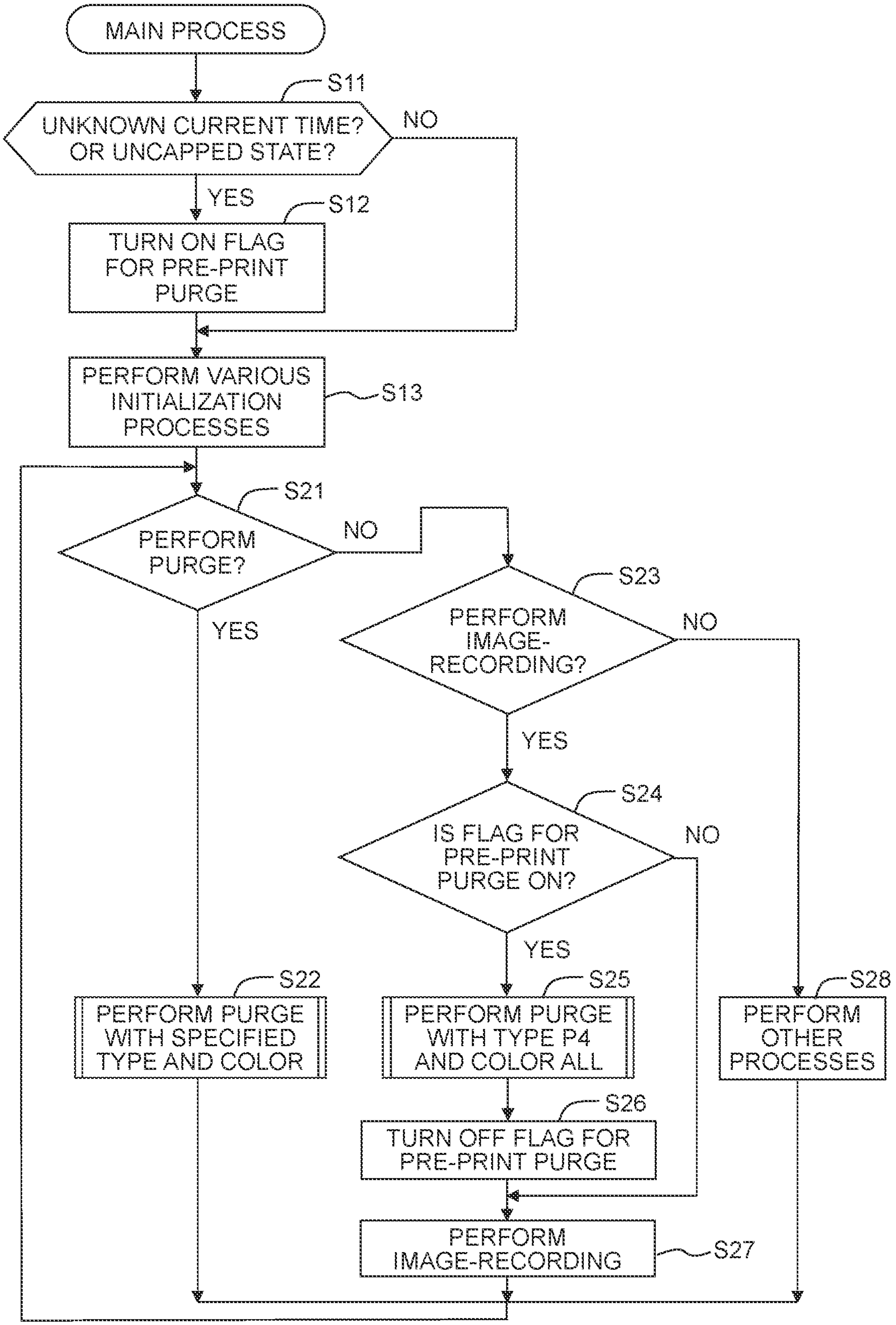
FIG. 6 depicts a flowchart of the main process.
Figure 7A:
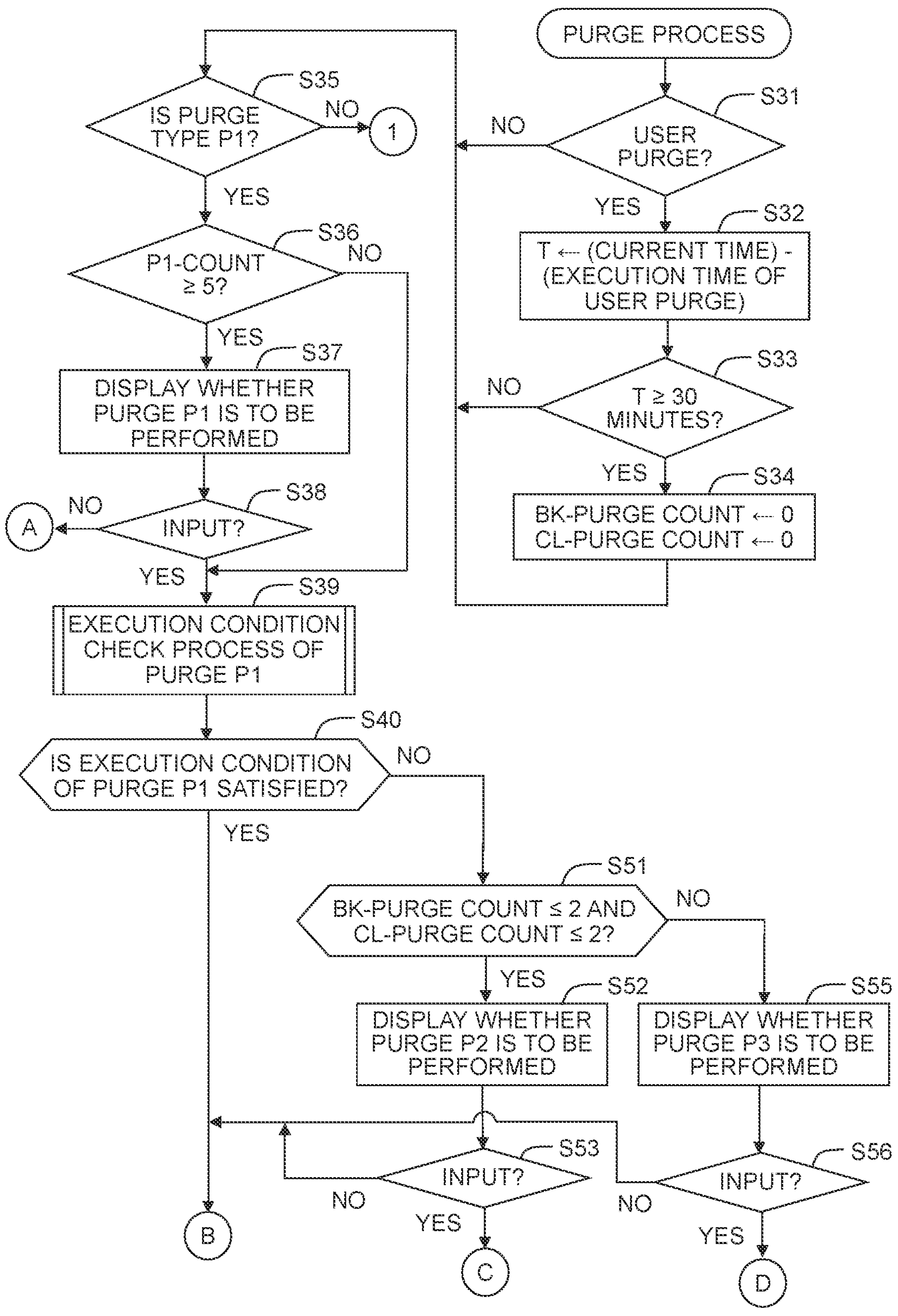
FIGS. 7A and 7B depict a flowchart of the purge process.
Figure 7B:
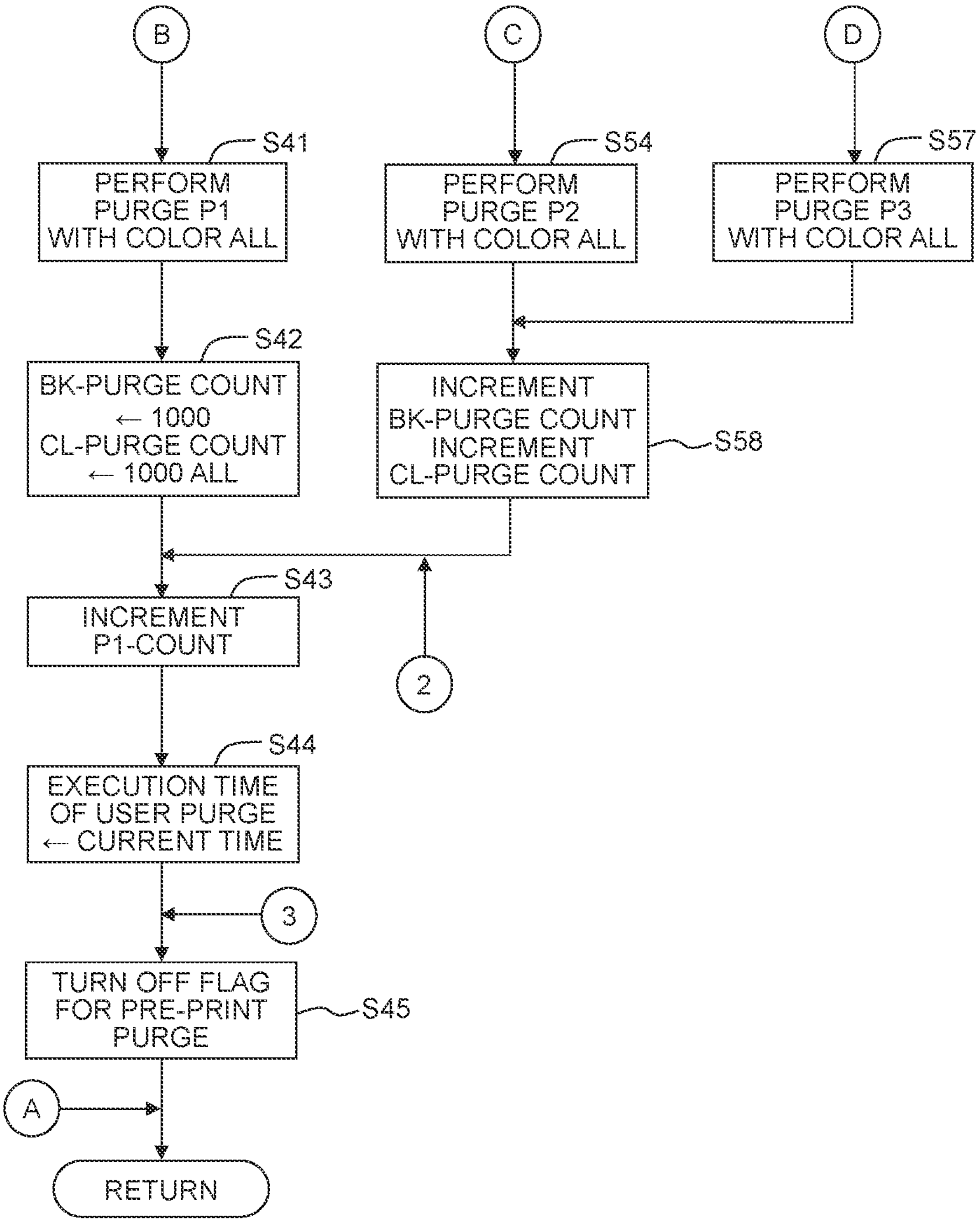
Figure 8:
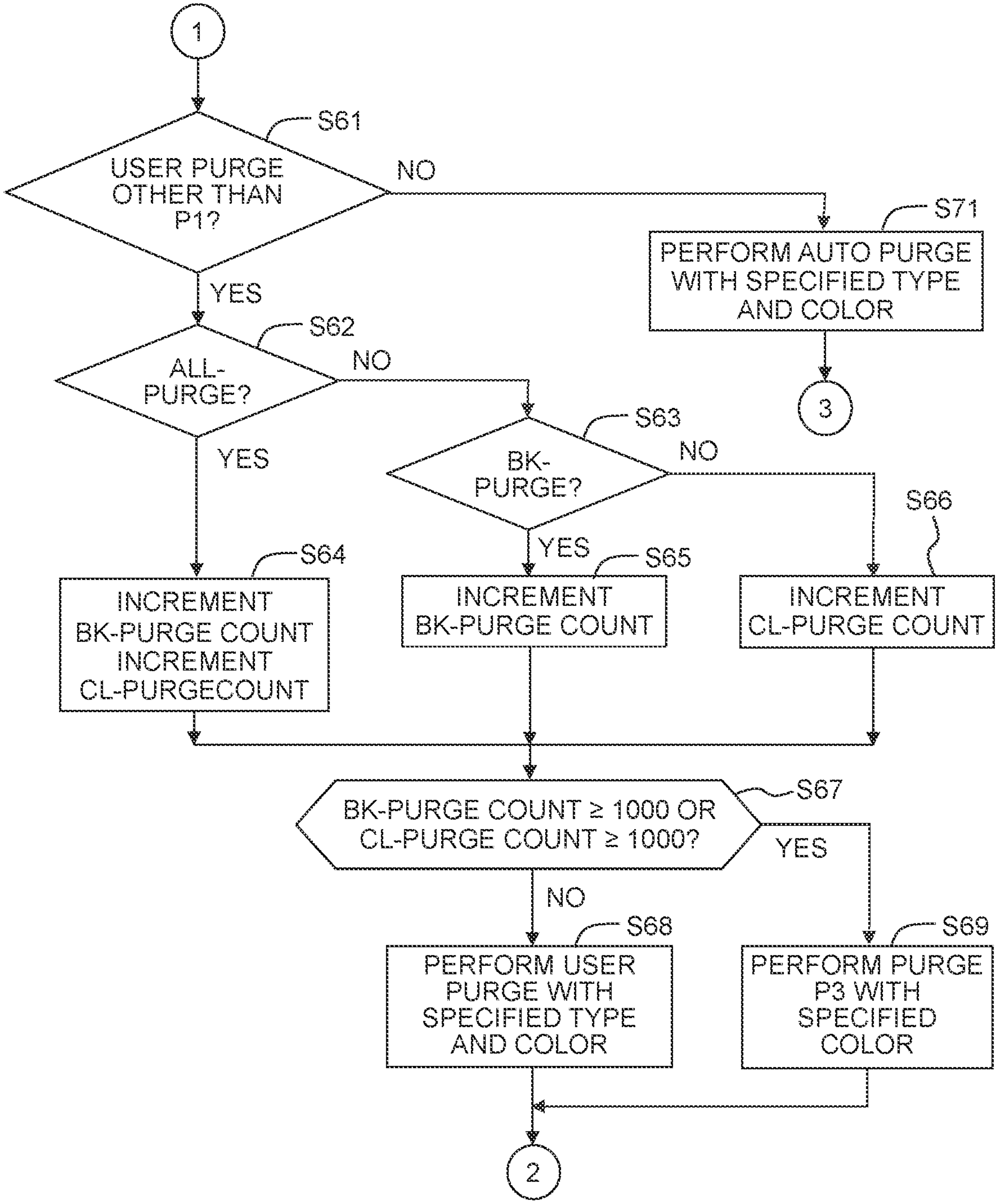
FIG. 8 depicts a continuation of FIGS. 7A and 7B.
Figure 9:
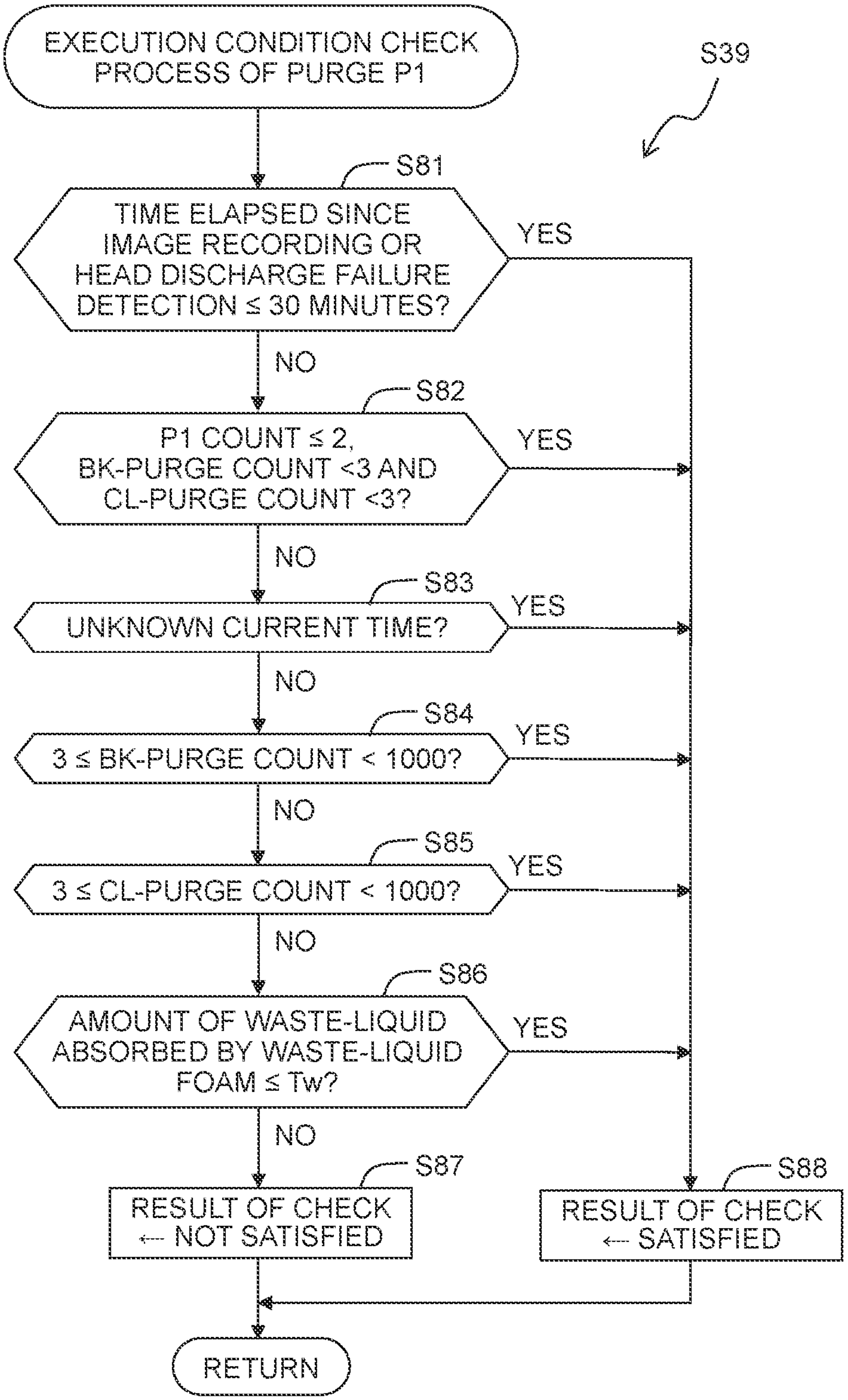
FIG. 9 depicts a flowchart of the purge P1 execution condition check process.

The controller 60 executes a main process depicted in FIG. 6, a purge process depicted in FIGS. 7A, 7B and 8, and a purge P1 execution condition check process depicted in FIG. 9 by CPU 61 executing the program stored in RAM 63 when the printer 10 is turned on. The controller 60 uses the pre-print purge flag in the main process. The pre-print purge flag is set to ON when purge is to be executed before printing, and is set to OFF when purge is not to be executed before printing. The pre-print purge flag is set to OFF before the main process is executed.

At the beginning of the main process (FIG. 6), the controller 60 determines whether or not the printer 10 is in the Unknown-Current-Time state and the Uncapped state (S11). In the process of S11, the controller 60 determines that the printer 10 is in the Unknown-Current-Time state when the time information stored in RAM 63 does not indicate the current time. The controller 60 also determines that the printer 10 is in the Uncapped state when the position of the carriage 31 determined based on the output signal of the encoder 43 is not the standby position.

The controller 60 proceeds to the process of S12 in response to determining that the printer 10 is in the Unknown-Current-Time state and the Uncapped state (S11: Yes). In this case, the controller 60 sets the pre-print purge flag to ON (S12) and proceeds to the process of S13. In response to the determination in the process of S11 that the printer 10 is not "in the Unknown-Current-Time state and in the Uncapped state" (that is, the printer 10 is not in the Unknown-Current-Time state or not in the Uncapped state) (S11: No), the controller 60 does not perform the process of S12 and proceeds to the process of S13. Next, the controller 60 executes various initialization processes (S13). Thereafter, the controller 60 repeatedly executes the processes from S21 to S28.

In the process of S11, the controller 60 determines whether or not the printer 10 is in the Unknown-Current-Time state and the Uncapped state. Alternatively, controller 60 may determine in the process of S11 whether or not the printer 10 is in the Unknown-Current-Time or in the Uncapped state.

The controller 60 determines whether or not to execute purge in the process of S21. For example, when the user instructs the execution of purge using the operation part 17 or when it is the timing to execute automatic purge, the controller 60 determines that purge is to be executed in the process of S21. In response to the decision to execute the purge (S21: Yes), the controller 60 proceeds to the process of S22. In this case, controller 60 calls and executes the purge process with the specified type and color (S22). The purge type is one of P0-P4 and the purge color is one of ALL, BK and CL.

The controller 60 proceeds to the process of S23 in response to the decision not to execute purge in the process of S21 (S21: No). In this case, the controller 60 determines whether or not to execute image recording (S23). For example, the user may instruct the execution of image recording using the operation part 17, or the printer 10 may receive an instruction to execute image recording from a terminal device connected to the printer 10 via an unshown communication interface. In such a case, the controller 60 determines that image recording is to be executed in the process of S23.

The controller 60 proceeds to the process of S24 in response to the decision to perform image recording in the process of S23 (S23: Yes). In this case, the controller 60 determines whether the pre-print purge flag is ON (S24). In response to determining that the pre-print purge flag is ON (S24: Yes), the controller 60 proceeds to the process of S25. In this case, the controller 60 calls and executes the purge process with type P4, color ALL (S25). In the process of S25, the purge P4, which is the weakest intensity and consumes the least amount of ink among the purges P0-P4, is executed for the first through fourth nozzle rows. Next, the controller 60 sets the pre-print purge flag to OFF (S26) and executes image recording (S27).

In response to determining that the pre-print purge flag is not ON (OFF) in the process of S24 (S24: No), the controller 60 proceeds to the process of S27 without executing the processes of S25 and S26. The controller 60 then executes image recording in the process of S27.

In response to the decision not to perform image recording in the process of S23 (S23: No), the controller 60 proceeds to the process of S28. In this case, the controller 60 executes other processes (other than purge and image recording) (S28). After executing any of the processes in S22, S27, and S28, the controller 60 proceeds to the process in S21.

[Purge Process]

The controller 60 uses the user purge execution time, BK purge count, CL purge count, and P1 count in the purge process executed in the process in S22 or S25. The user purge execution time indicates the time when the user purge (any of purges P1-P3) was last executed. The BK purge count indicates a sum of the BK purge execution count and the ALL purge execution count. The CL purge count indicates a sum of the CL purge execution count and the ALL purge execution count. The BK purge count and the CL purge count are reset to 0 before the main process is executed and are reset to 0 if no user purge is performed for 30 minutes (see S33 and S34 in FIG. 7A). The P1 count indicates the total number of purge P1 executions. The P1 count is reset to 0 at the initial installation of the printer 10.

At the beginning of the purge process (FIG. 7A), the controller 60 determines whether the specified purge is the user purge (any of purges P1-P3) (S31). In response to determining that it is the user purge (S31: Yes), the controller 60 proceeds to the process of S32. In this case, the controller 60 determines an elapsed time T since the user purge was last executed by determining the difference between the current time and the user purge execution time (S32). Next, the controller 60 determines whether the elapsed time T is 30 minutes or more (S33). In response to determining that the elapsed time T is 30 minutes or more (S33: Yes), the controller 60 proceeds to the process of S34. In this case, the controller 60 resets the BK purge count and CL purge count to 0 (S34) and proceeds to the process of S35.

In response to determining that it is not the user purge in the process of S31 (S31: No), the controller 60 proceeds to the process of S35 without executing the processes of S32 through S34. Also, in response to the controller 60 determining that the elapsed time T is less than 30 minutes (the elapsed time T<30 minutes) in the process of S33 (S33: No), the controller 60 proceeds to the process of S35 without executing the process of S34. Thus, the BK purge count and the CL purge count are reset to 0 if no user purge is performed for 30 minutes.

In the process of S35, the controller 60 determines whether the specified purge type is P1. In response to determining that the specified purge type is P1 (S35: Yes), the controller 60 proceeds to the process of S36. In this case, the controller 60 determines whether the P1 count is 5 or more (S36). In response to determining that the P1 count is 5 or more (S36: Yes), the controller 60 proceeds to the process of S37. In this case, the controller 60 controls the display 16 to display whether the purge P1 is to be performed (S37). In the process of S37, the controller 60 controls the display 16 to display, for example, "Execute purge P1?". In response, the user operates the operation part 17 to input Yes or No.

Next, the controller 60 determines whether Yes or No is input from the operation part 17 (S38). In response to determining that No is input in the process of S38 (S38: No), the controller 60 terminates the purge process without performing any further processing. Thus, the controller 60 controls the display 16 to display the first message when the purge P1 has already been performed five or more times, and does not perform the purge P1 when No is input in response to the first message.

The controller 60 proceeds to the process of S39 in response to determining that Yes is input in the process of S38 (S38: Yes). In this case, the controller 60 executes the purge P1 execution condition check process depicted in FIG. 9 (S39).

At the beginning of the purge P1 execution condition check process (FIG. 9), the controller 60 determines whether an elapsed time from the image recording or discharge failure detection of the head 32 is 30 minutes or less (S81). The controller 60 proceeds to the process of S82 in response to determining that the elapsed time is not less than 30 minutes (has exceeded 30 minutes) (S81: No). In this case, the controller 60 determines whether the P1 count is less than 2, the BK purge count is less than 3, and the CL purge count is less than 3 (S82). In response to determining that the P1 count is not less than 2, the BK purge count is not less than 3, and the CL purge count is not less than 3 (the P1 count≥3, the BK purge count≥3, or the CL purge count≥3) (S82: No), the controller 60 proceeds to the process of S83.

In this case, the controller 60 determines whether or not the printer 10 is in the Unknown-Current-Time state (S83). In the process of S83, the controller 60 determines that the printer 10 is in the Unknown-Current-Time state when the time information stored in RAM 63 does not indicate the current time. In response to determining that the printer 10 is not in the Unknown-Current-Time state (S83: No), the controller 60 proceeds to the process of S84. In this case, the controller 60 determines whether the BK purge count is not less than 3 and less than 1000 (S84). In response to determining that the BK purge count does not satisfy “3<BK purge count<1000” (the BK purge count is less than 3 or is not less than 1000) (S84: No), the controller 60 proceeds to the process of S85.

In this case, controller 60 determines whether the CL purge count is not less than 3 and less than 1000 (S85). In response to determining that the CL purge count does not satisfy “3≤CL purge count<1000” (CL purge count is less than 3 or is not less than 1000) (S85: No), the controller 60 proceeds to the process in S86. In this case, the controller 60 determines whether amount of waste-liquid absorbed by the waste-liquid foam 58 (FIG. 5) in the waste-liquid tank 57 is not more than the threshold value Tw (S86). In response to determining that the amount of waste-liquid is greater than the threshold value Tw (exceeds the threshold value Tw) (S86: No), the controller 60 proceeds to S87.

When the printer 10 performs the image recording or purge, the controller 60 determines the amount of ink consumed by the image recording or purge and the amount of increase in waste liquid due to the image recording or purge. The controller 60 determines the amount of waste-liquid absorbed by the waste-liquid foam 58 in the waste-liquid tank 57 based on the determined increase in waste-liquid and the amount of evaporation of the waste-liquid. The obtained amount of waste-liquid is stored in RAM 63 and EEPROM 64. In the process of S86, the amount of waste-liquid stored in RAM 63 is referred to.

In response to determining that the elapsed time is 30 minutes or less in the process of S81 (S81: Yes), the controller 60 proceeds to the process of S88.

The controller 60 proceeds to the process of S88 in response to determining that the P1 count is 2 or less, the BK purge count is less than 3, and the CL purge count is less than 3 in the process of S82 (S82: Yes). The controller 60 proceeds to the process of S88 in response to determining that the printer 10 is in the Unknown-Current-Time state in the process of S83 (S83: Yes). The controller 60 proceeds to the process of S88 in response to determining that the BK purge count is not less than 3 and less than 1000 in the process of S84 (S84: Yes). The controller 60 proceeds to the process of S88 in response to determining that the CL purge count is 3 or more and less than 1000 in the process of S85 (S85: Yes). The controller 60 proceeds to the process of S88 in response to determining that the amount of waste-liquid absorbed in the waste-liquid foam 58 is not greater than the threshold value Tw in the process of S86 (S86: Yes).

Thus, the controller 60 proceeds to the process of S88 in response to determining Yes in any of the processes from S81 to S86. In this case, the controller 60 sets the check result to “satisfied” (S88), and controller 60 proceeds to the process of S87 in response to having determined No in any of the processes from S81 to S86. In this case, the controller 60 sets the check result to “not satisfied” (S87). After executing either S87 or S88, the controller 60 terminates the purge P1 execution condition check process.

Returning to FIG. 7A, after executing the process of S39, the controller 60 determines whether the purge P1 execution condition is satisfied (S40). The controller 60 proceeds to the process of S41 in response to determining that the purge P1 execution condition is satisfied (S40: Yes). In this case, the controller 60 executes the purge P1 in color ALL (S41). In the process of S41, for the first to fourth nozzle rows, the purge P1 is executed with the strongest intensity and the highest ink consumption among the user purges P1-P3. Thus, the controller 60 executes the purge P1 according to the judgment that the purge P1 execution condition is met.

Next, controller 60 sets the BK purge count and the CL purge count to 1000 (S42). “The BK purge count or the CL purge count is 1000 or more” indicates that the purge P1 is included among the user purges performed less than 30 minutes apart, that is, the purge P1 has been performed recently. Next, controller 60 adds 1 to the P1 count (S43). Next, the controller 60 acquires the current time and sets the acquired current time to the user purge execution time stored in RAM 63 (S44). Next, the controller 60 sets the pre-print purge flag to OFF (S45) and ends the purge process.

The controller 60 proceeds to the process of S51 in response to determining that the purge P1 execution condition is not met in the process of S40 (S40: No). In this case, the controller 60 determines whether the BK purge count is 2 or less and the CL purge count is 2 or less (S51). In response to determining that the BK purge count is 2 or less and the CL purge count is 2 or less (S51: Yes), the controller 60 proceeds to the process of S52. In this case, the controller 60 controls the display 16 to display whether the purge P2 can be executed (S52). In the process of S52, the controller 60 controls the display 16 to display a second message, for example, “Executing purge P1 is too early. Do you accept executing purge P2, which is weaker than purge P1?”. In response, the user operates the operation part 17 to input Yes or No.

Next, the controller 60 determines whether Yes or No is input from the operation part 17 (S53). In response to determining that Yes was input in the process of S53 (S53: Yes), the controller 60 proceeds to the process of S54. In this case, the controller 60 executes the purge P2 in color ALL (S54) and proceeds to the process of S58. In the process of S54, the purge P2, which is the second strongest in intensity and the second highest in ink consumption among the user purges P1-P3, is executed. If the purge P1 execution condition is not met and the user purge has been executed only a small number of times, the controller 60 executes the purge P2 instead of the purge P1 after displaying the second message and obtaining user confirmation.

In response to determining in S51 that the condition of “the BK purge count is 2 or less and the CL purge count is not 2 or less” is not satisfied (the BK purge count is 3 or more or the CL purge count is 3 or more) (S51: No), the controller 60 proceeds to the process in S55. In this case, the controller 60 controls the display 16 to display whether the purge P3 can be executed (S55). In processing S55, the controller 60 controls the display 16 to display a third message, for example, “The purge P1 has just been executed. Do you accept executing purge P3, which is weaker than purge P1?”. In response, the user operates the operation part 17 to input Yes or No.

Next, the controller 60 determines whether Yes or No is input from the operation part 17 (S56). In response to determining that Yes is input in the process of S56 (S56: Yes), the controller 60 proceeds to the process of S57. In this case, the controller 60 executes the purge P3 in color ALL (S57) and proceeds to the process of S58. If the purge P1 execution condition is not met and the user purge has already been executed a certain number of times, the controller 60 executes the purge P3 instead of the purge P1 after displaying the third message and obtaining user confirmation.

After executing the process of S54 or S57, the controller 60 reaches the process of S58. Next, the controller 60 adds 1 to the BK purge count and the CL purge count, respectively (S58). The controller 60 then proceeds to the process of S44, sets the current time to the user purge execution time (S44), sets the pre-print purge flag to OFF (S45), and terminates the purge process.

The controller 60 proceeds to S41 in response to determining that No was input in the process of S53 (S53: No). The controller 60 proceeds to S41 in response to determining that No was input in the process of S56 (S56: No). In these cases, the controller 60 executes purge P1 in color ALL (S41) and then executes the process in S42 to S45 in the same manner as when the purge P1 execution condition is determined to be met in process in S40. Thus, even if the purge P1 execution condition is not met, the controller 60 executes the purge P1 if the user's confirmation is not obtained.

In response to determining that the type of purges specified in the process of S35 is not P1 (S35: No), the controller 60 proceeds to the process of S61 depicted in FIG. 8. In this case, the controller 60 determines whether the specified purge is a user purge other than the purge P1 (the purge P2 or P3) (S61). In response to determining that the purge is the user purge other than the purge P1 (S61: Yes), the controller 60 proceeds to the process of S62.

In this case, the controller 60 determines whether the specified purge is the ALL purge (S62). In response to determining that the specified purge is the ALL purge (S62: Yes), the controller 60 proceeds to the process of S64. In this case, the controller 60 adds 1 to the BK purge count and the CL purge count, respectively (S64) and proceeds to the process of S67.

In response to determining that the specified purge is not the ALL purge in the process of S62 (S62: No), the controller 60 proceeds to the process of S63. In this case, the controller 60 determines whether the specified purge is the BK purge (S63). In response to determining that the specified purge is the BK purge (S63: Yes), the controller 60 proceeds to the process of S65. In this case, the controller 60 adds 1 to the BK purge count (S65) and proceeds to the process of S67.

The controller 60 determines that the specified purge is not the BK purge (the specified purge is the CL purge) in the process of S63 (S63: No) and proceeds to the process of S66. In this case, the controller 60 adds 1 to the CL purge count (S66) and proceeds to the process of S67. In this way, the controller 60 adds 1 to one or both of the BK purge count and the CL purge count, depending on the color of the purge to be performed, in the processes from S62 to S66.

After executing any processes of S64 to S66, the controller 60 reaches the process of S67. Next, the controller 60 determines whether the BK purge count is 1000 or more or the CL purge count is 1000 or more (S67). In response to determining that the condition of "the BK purge count is not 1000 or more or the CL purge count is not 1000 or more" is not satisfied (the BK purge count is less than 1000 and the CL purge count is less than 1000) (S67: No), the controller 60 proceeds to the process of S68. In this case, the controller 60 executes the user purge with the specified type and color (S68) and proceeds to the process of S44 depicted in FIG. 7B.

In response to determining that the BK purge count is 1000 or more or the CL purge count is 1000 or more in the process of S67 (S67: Yes), the controller 60 proceeds to the process of S69. In this case, the controller 60 executes the purge P3 with the specified color (S69) and proceeds to the process of S44 depicted in FIG. 7B.

As noted above, the condition of "the BK purge count or the CL purge count is 1000 or greater" indicates that the purge P1 has been recently performed. When executing the user purge other than the purge P1, the controller 60 executes the specified type of user purge (S68) if the purge P1 has not been executed recently, or executes the purge P3 if the purge P1 has been executed recently (S69).

The controller 60 proceeds to the process of S71 in response to determining that the purge is not the user purge other than the purge P1 in the process of S61 (S61: No). In this case, the controller 60 executes the automatic purge with the specified type and color (S71) and proceeds to the process of S45 depicted in FIG. 7B. If the specified purge is the automatic purge, the controller 60 executes the automatic purge with the specified type and color.

In the above explanation, the purges P0-P4 are examples of the recovery processes for the head 32. The purges P1 to P3 are examples of user-selectable recovery processes for the head 32. When the amount of ink consumed by the purge P2 is set as the first threshold amount, the purge P1 is an example of the first recovery process, where the amount of ink consumed is greater than the first threshold amount among purges P1-P3. The purge P1 is also an example of the first recovery process with the highest ink consumption among the purges P1-P3. The purge P2 and P3 are examples of the second recovery process and the third recovery process that consume less ink than the first recovery process and are also examples of the second recovery process other than the first recovery process.

The process of S35 is an example of the first judgment process to determine whether or not the instruction input from the operation part 17 is the execution instruction for the first recovery process. The processes of S39 and S40 are examples of the second judgment process that determines whether or not the execution condition for the first recovery process is met in response to the first judgment process determining that the execution instruction for the first recovery process is input. The processes of S41, S54, and S57 are examples of recovery control processes that execute the first recovery process in response to the second judgment process determining that the execution condition is satisfied, and do not execute the first recovery process in response to the second judgment process determining that the execution condition is not satisfied.

The 30 minutes in the process of S33 is an example of the first time and the first threshold time. The 30 minutes in the process of S81 is an example of the second threshold time. The 2 times in the process of S82 is an example of the second threshold count. The 3 times in the processes of S84 and S85 is an example of the first threshold count. The threshold value Tw in the process of S86 is an example of the second threshold amount.

In the above explanation, the controller 60 sets the check result to "satisfied" in response to determining that the P1 count is 2 or less, the BK purge count is less than 3, and the CL purge count is less than 3 in the S82 process. Alternatively, the controller 60 may set the check result to "satisfied" regardless of the BK purge count and CL purge count in response to the determination that the P1 count is 2 or less in the process of S82.

Technical Effects of Embodiment

As depicted above, the printer 10 of the embodiment includes the head 32, the operation part 17, and the controller 60. The controller 60 executes the first judgment process (S35) to determine whether or not the instruction input from the operation part 17 is an instruction to execute the purge P1, which is the user-selectable recovery process for the head 32, of purges P1 to P3, where the ink consumption is higher than the first threshold amount (ink consumption by the purge P2). The controller 60 executes the second judgment process (S39, S40) to determine whether or not the purge P1 execution condition is met in response to determining that the instruction input is the execution instruction for the purge P1 in the first judgment process. The controller 60 executes the recovery control process where the controller 60 executes the purge P1 (S41) in response to determining that the purge P1 execution condition is met in the second judgment process and does not execute the purge P1 (S54, S57) in response to determining that the purge P1 execution condition is not met in the second judgment process.

Therefore, in the printer 10 of the embodiment, even when the user instructs the execution of the purge P1, in which the amount of ink consumed is greater than the first threshold amount, the purge P1 is not executed if the purge P1 execution condition is not met. Thus, the execution of purge P1 can be limited and the amount of ink consumed in the recovery process of the head 32 can be reduced.

In the recovery control process, the controller 60 executes a second recovery process (the purge P2 or P3) that consumes less ink than the purge P1 (S54, S57) in response to determining that the purge P1 execution condition is not met in the second judgment process. Thus, when the user instructs the execution of purge P1 but the purge P1 execution condition is not met, the amount of ink consumed in the recovery process of the head 32 can be reduced while executing the recovery process of the head 32 in accordance with the user's instructions.

The purge P1 execution condition is that the third recovery process (the purge P2 or P3), which consumes less ink than the purge P1, has already been executed at least the first threshold number of times (three times) at intervals of less than the first threshold (30 minutes), and that the elapsed time since the last third recovery process is less than the first time (S84, S85). Therefore, when the user instructs the execution of the purge P1, the purge P1 is executed on the condition that the third recovery process with low ink consumption has been executed a predetermined number of times or more before that. Therefore, the amount of ink consumed in the recovery process of the head 32 can be reduced by ensuring that the third recovery process has an opportunity to eliminate the discharge defect of the head 32 before executing the purge P1.

The purge P1 execution condition is that the elapsed time T after executing the purge P1 is equal to or longer than the first threshold time (30 minutes) (S33, S82). Thus, unnecessary consumption of ink by continuously executing the purge P1 can be prevented and the amount of ink consumed in the recovery process of the head 32 can be reduced.

The printer 10 further has the RAM 63 that stores time information indicating the current time, and the purge P1 execution condition is that the time information stored in the RAM 63 does not indicate the current time (S83). Thus, if the current time is unknown when the user instructs the purge P1 to be executed, the purge P1 is executed.

The purge P1 execution condition is that the elapsed time since the image recording or the discharge failure detection for the head 32 was executed is less than the second threshold time (30 minutes) (S81). Therefore, when the user instructs the execution of purge P1, purge P1 is executed on the condition that image recording or head 32 discharge failure detection has been executed before that. Therefore, unnecessary purge P1 is not executed when the image recording and the discharge failure detection for the head 32 have not been executed, and the amount of ink consumed in the recovery process for the head 32 can be reduced.

The purge P1 execution condition is that the total number of times of the purge P1 executed (the P1 count) is less than the second threshold number of times (2 times) (S82). Therefore, by limiting the total number of times of the purge P1 executed, the amount of ink consumed in the recovery process for the head 32 can be reduced.

The printer 10 is further equipped with a waste-liquid foam 58 that absorbs waste-liquid discharged from the head 32, and the purge P1 execution condition is that the amount of waste-liquid absorbed in the waste-liquid foam 58 is less than the second threshold amount (threshold value Tw) (S86). Therefore, when the user instructs the execution of purge P1, purge P1 is executed on the condition that the amount of waste liquid absorbed in the waste liquid foam 58 is small. Therefore, the purge P1 is not executed when there is a large amount of waste-liquid absorbed in the waste-liquid foam 58, and thereby the amount of ink consumed in the recovery process for the head 32 can be reduced.

The controller 60 also executes the first judgment process (S35), the second judgment process (S39, S40), and the recovery control process (S41, S54, S57). In the first judgment process (S15), the controller 60 determines whether the instruction input from the operation part 17 is the instruction to execute the purge P1 or the purge other than the purge P1 among the user-selectable recovery processes of the head 32, the purges P1 to P3. In the second judgment process (S39, S40), the controller 60 determines whether or not the purge P1 execution condition is met according to the judgment that the instruction input is the execution instruction for the purge P1 in the first judgment process. In the recovery control process (S41, S54, S57), the controller 60 executes the purge P1 in response to the second judgment process determining that the purge P1 execution condition is met (S41), and does not execute the purge P1 in response to the second judgment process determining that the purge P1 execution condition is not met.

Therefore, in the printer 10 of the embodiment, even when the user instructs execution of the purge P1, which is one of the user-selectable recovery processes for the head 32, the purge P1 is not executed if the purge P1 execution condition is not met. Therefore, the execution of purge P1 can be limited and the amount of ink consumed in the recovery process for the head 32 can be reduced.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

[Modifications]

The modifications of the printer 10 in the embodiment are explained. In the purge P1 execution condition check process (FIG. 9), the controller 60 of the printer 10 determines that the purge P1 execution condition is satisfied according to a determination of Yes in any of S81 to S86. The controller of the printer for the variant may determine that the purge P1 execution condition is satisfied according to a judgment criterion other than the above. For example, the controller may determine that the purge P1 execution condition is satisfied when any of some of the conditions in the process of S81 to S86 are satisfied. The controller may determine that the purge P1 execution condition is satisfied in response to the determination of Yes in the process of S83. The controller may determine that the purge P1 execution condition is satisfied in response to a determination of Yes in the process of S81 or S82. The controller may determine that the purge P1 execution condition is satisfied in response to determining that the condition for executing purge P1 is met, in response to the determination of Yes in any of the process of S82, S83, and S86.

The controller of the printer according to the modification may also determine that the purge P1 execution condition is satisfied when conditions other than the conditions in the processes of S81 to S86 are satisfied. For example, the controller may determine that the purge P1 execution condition is satisfied when the third recovery process, which consumes less ink than purge P1, is executed more than the first threshold number of times within the first time from the current time. In other words, the purge P1 execution condition may be that the third recovery process with less ink consumption than purge P1 was executed more than the first threshold number of times within the first time from the current time.

When executing the user purge other than purge P1 (S61: Yes), the controller 60 of printer 10 determines whether the purge P1 has been executed recently (S67) and whether to execute the specified type of user purge (S68) or the purge P3 (S69) depending on the result of the determination. Alternatively, the controller of the printer may unconditionally execute the specified type of user purge when executing a user purge other than the purge P1, without determining whether the purge P1 has been executed recently.

If the controller 60 of printer 10 determines that the purge P1 execution condition is not met (S40: No), the controller 60 control the display to display whether a purge weaker than the purge P1 can be executed (S52, S55) and executes the purge P2 or P3 (S54, S57) in response that Yes is input from the user. Alternatively, the controller of the printer may execute the purge P2 in S54 without executing the processes of S52 and S53 and execute the purge P3 in S57 without executing the processes of S55 and S56.

The controller of the printer may switch the purge P1 execution condition according to the contract information stored in the memory (RAM 63, EEPROM 64). For example, if the contract information indicates that a delivery contract for a cartridge (an example of a tank) has been concluded, the controller may determine whether to execute the purge P1 under stricter execution conditions than if the contract information indicates that no delivery contract has been concluded.

Figure 10:
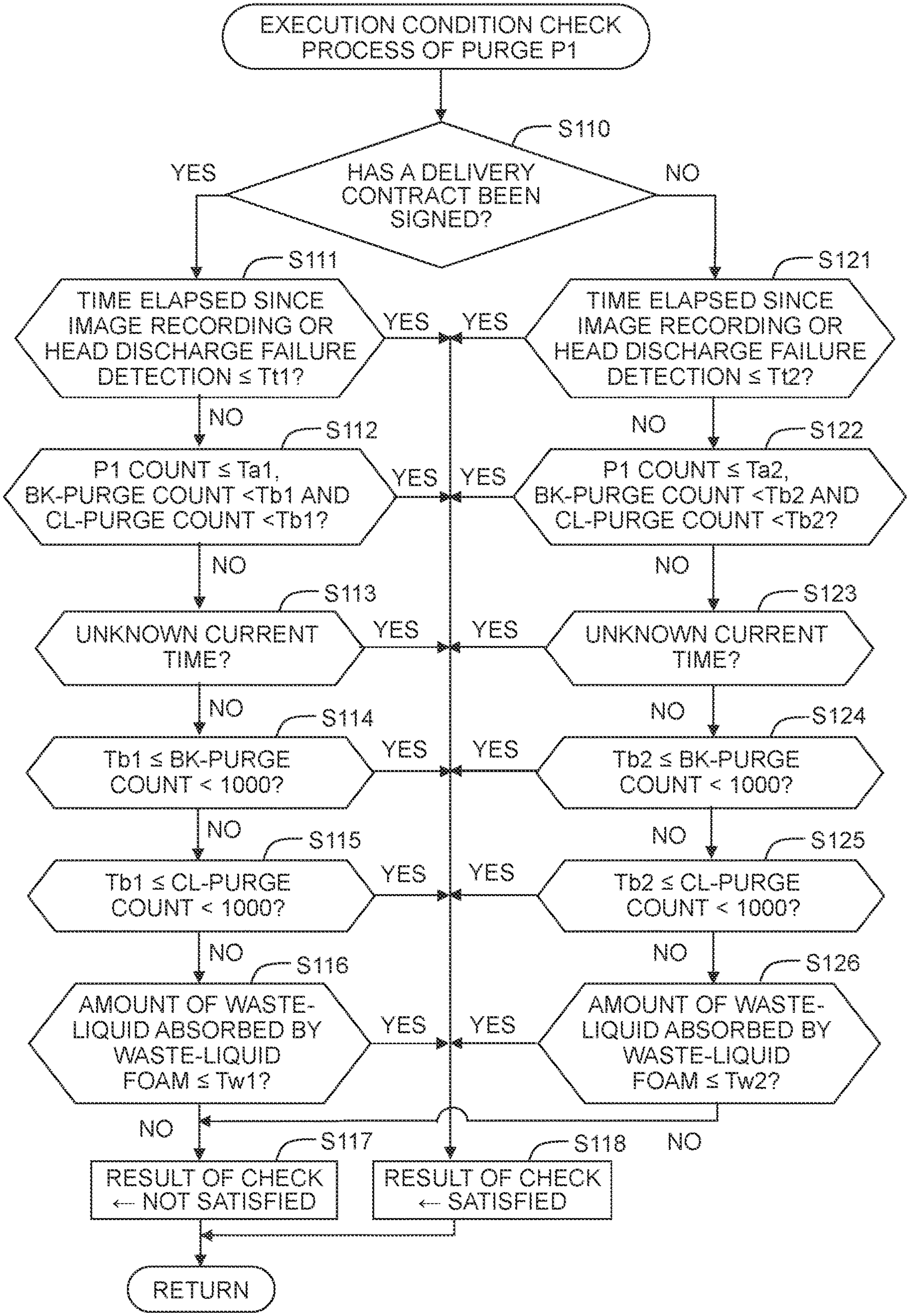
FIG. 10 depicts a flowchart of the purge P1 execution condition check process of the printer.

The controller of the printer may execute the purge P1 execution condition check process depicted in FIG. 10, for example, instead of the purge P1 execution condition check process depicted in FIG. 9. At the beginning of the purge P1 execution condition check process, the controller determines whether the contract information stored in RAM 63 or EEPROM 64 indicates that a delivery contract has been concluded (S110). In response to determining that the delivery contract indicates that the delivery contract has been concluded (S110: Yes), the controller proceeds to the process of S111. In this case, the controller performs the conditional judgment in the process of S111-S116 and executes the process of S117 or S118 according to the judgment result. In response to determining that the delivery contract is not concluded (S110: No), the controller proceeds to the process of S121. In this case, the controller performs the conditional judgment in the process of S121 to S126 and executes the process of S117 or S118 as a result of the judgment.

The process of S111 and S121 is the same conditional judgment as the process of S81 depicted in FIG. 9. The process of S112 and S122 is the same conditional judgment as the process of S82 depicted in FIG. 9. The process of S113 and S123 is the same conditional judgment as the process of S83 depicted in FIG. 9. The process of S114 and S124 is the same conditional judgment as the process of S84 depicted in FIG. 9. The process of S115 and S125 is the same conditional judgment as the process of S85 depicted in FIG. 9. The process of S116 and S126 is the same conditional judgment as the process of S86 depicted in FIG. 9. The process of S117 is the same as the process of S87 depicted in FIG. 9. The process of S118 is the same as the process of S88 depicted in FIG. 9.

The controller determines whether the elapsed time from the image recording or the discharge failure detection of the head is less than or equal to time Tt1 in the S111 process, and whether the elapsed time is less than or equal to time Tt2 in the S121 process. Note that, the time Tt1 is less than the time Tt2. The controller determines whether the P1 count is less than or equal to the number of times Ta1, the BK purge count is less than the number of times Tb1, and the CL purge count is less than the number of times Tb1 in the process of S112. The controller determines whether the P1 count is less than or equal to the number of times Ta2, the BK purge count is less than the number of times Tb2, and the CL purge count is less than Tb2. Note that, the count Ta1 is less than the count Ta2 and the count Tb1 is less than the count Tb2.

The controller determines whether the BK purge count is greater than or equal to Tb1 and less than 1000 times in the process of S114, and whether the BK purge count is greater than Tb2 and less than 1000 times in the process of S124. The controller determines whether the CL purge count is greater than or equal to Tb1 and less than 1000 times in the process of S115, and whether the CL purge count is greater than or equal to Tb2 and less than 1000 times in the process of S125. The controller determines whether the amount of waste-liquid absorbed in the waste-liquid foam is less than or equal to quantity Tw1 in the process of S116, and whether the amount of waste-liquid is less than or equal to quantity Tw2 in the process of S126. Note that, the amount Tw1 is less than the amount Tw2.

When the values in each step are determined in this way, the purge P1 execution condition indicated in the processes S111-S116 are stricter than the purge P1 execution condition indicated in the processes S121-S126. In other words, the purge P1 execution condition when a delivery contract is concluded are stricter than the purge P1 execution condition when no delivery contract is concluded.

The following conditions may be established, the time Tt1 is less than or equal to the time Tt2, the number of times Ta1 is less than or equal to the number of times Ta2, the number of times Tb1 is less than or equal to the number of times Tb2, and the quantity Tw1 are less than or equal to the quantity Tw2. In addition, one of the following conditions may be established, the time Tt1 is less than the time Tt2, the number of times Ta1 is less than the number of times Ta2, the number of times Tb1 is less than the number of times Tb2, and the quantity Tw1 is less than the quantity Tw2. In this case, too, the purge P1 execution condition when a delivery contract is concluded are stricter than the purge P1 execution condition when no delivery contract is concluded.

If the contract information indicates that a delivery contract has been concluded, the controller determines whether to execute purge P1 under stricter execution conditions than if the contract information indicates that no delivery contract has been concluded. In this way, when the delivery contract is concluded, the purge P1 execution condition is more stringent, thereby limiting the execution of purge P1, reducing the amount of ink consumed in purge and preventing printer manufacturers and distributors from shipping more cartridges than necessary.

The printer 10 has a sub-tank 35 and a case 36 in which a cartridge 37 can be mounted (cartridge model). The printer may be equipped with a tank having an ink inlet (tank model). In the tank model printer, new ink is supplied to the printer by the user pouring ink contained in an ink bottle into the inlet of the tank.

The printer 10 also performs the purges P0-P4 as a maintenance process for the heads 32. The purge performed by the printer 10 may include a suction purge to suction the nozzles 33 in the nozzle row and an exhaust purge to suction the exhaust port corresponding to the nozzle row. The printer 10 may also perform purges other than the purges P0-P4. The printer may also perform flushing in addition to purge as the maintenance process for the head. The printer may be equipped with an ink level sensor for determining the remaining amount of ink stored in the sub-tank or cartridge and a mounting sensor for detecting whether or not the cartridge is mounted in the case.

What is claimed is:

1. A liquid discharge apparatus comprising:
- a head including a nozzle configured to discharge a liquid,
- a user interface configured to accept an instruction from a user, and
- a controller configured to:
  - determine whether a user input, via the user interface, is an instruction to execute a first recovery process, the first recovery process being a recovery process where a liquid consumption is greater than a first threshold amount;
  - determine whether an execution condition for the first recovery process is met, in response to determining that the user input is the instruction to execute the first recovery process, where the execution condition includes a second recovery process being executed more than a first number of times at intervals of less than a time period, and an elapsed time since the last execution of the second recovery process is less than the time period, the second recovery process being a recovery process where the liquid consumption is less than the liquid consumption in the first recovery process;
  - execute the first recovery process, in response to determining that the execution condition is met; and
  - skip the first recovery process, in response to determining that the execution condition is not met.

2. The liquid discharge apparatus according to claim 1, wherein
- the controller is configured to execute a different recovery process than the first recovery process, in response to determining that the execution condition is not met and determining that the user input is the instruction to execute the first recovery process, a liquid consumption in the different recovery process being less than the liquid consumption in the first recovery process.

3. The liquid discharge apparatus according to claim 1, wherein
- the execution condition further includes an elapsed time after the first recovery process being executed is equal to or more than a threshold time, wherein the execution condition is determined to be met in a case where the second recovery process is executed more than the first number of times at intervals of less than the time period, and the elapsed time since the last execution of the second recovery process is less than the time period and/or where the elapsed time after the first recovery process is executed is equal to or more than the threshold time.

4. The liquid discharge apparatus according to claim 1, further comprising a memory configured to store time information indicating a time set as a current time, wherein
- the execution condition further includes the time set as the current time in the memory does not indicate the current time, wherein the execution condition is determined to be met in a case where the second recovery process is executed more than the first number of times at intervals of less than the time period, and the elapsed time since the last execution of the second recovery process is less than the time period and/or where the time set as the current time in the memory does not indicate the current time.

5. The liquid discharge apparatus according to claim 1, wherein
- the execution condition further includes an elapsed time since an image recording or a detection of discharge failure of the head is less than or equal to a threshold time, wherein the execution condition is determined to be met in a case where the second recovery process is executed more than the first number of times at intervals of less than the time period, and the elapsed time since the last execution of the second recovery process is less than the time period and/or where the elapsed time since the image recording or the detection of discharge failure of the head is less than or equal to the threshold time.

6. The liquid discharge apparatus according to claim 1, wherein
- the execution condition includes a total number of times the first recovery process has been executed is less than or equal to a threshold number of times, wherein the execution condition is determined to be met in a case where the second recovery process is executed more than the first number of times at intervals of less than the time period, and the elapsed time since the last execution of the second recovery process is less than the time period and/or where the total number of times the first recovery process has been executed is less than or equal to the threshold number of times.

7. The liquid discharge apparatus according to claim 1, further comprising a waste-liquid foam positioned to absorb a waste liquid discharged from the head, wherein
- the execution condition includes an amount of waste liquid absorbed in the waste-liquid foam being less than or equal to a second threshold amount, wherein the execution condition is determined to be met in a case where the second recovery process is executed more than the first number of times at intervals of less than the time period, and the elapsed time since the last execution of the second recovery process is less than the time period and/or the amount of waste liquid absorbed in the waste-liquid foam is less than or equal to the second threshold amount.

8. The liquid discharge apparatus according to claim 1, further comprising a memory configured to store contract information indicating whether a delivery contract for a tank containing the liquid has been concluded, wherein
- in the determination of whether the execution condition is met, the controller is configured to determine whether the execution condition for the first recovery process is met using a stricter evaluation of the execution condition when the contract information indicates that the delivery contract has been concluded than when the contract information indicates that the delivery contract has not been concluded.

9. A liquid discharge apparatus comprising:

a head including a nozzle configured to discharge a liquid, a user interface configured to accept an instruction from a user, and a controller configured to:

determine whether a user input, via the user interface, is an instruction to execute a first recovery process, the first recovery process being a recovery process where a liquid consumption is greater than a first threshold amount;

determine whether an execution condition for the first recovery process is met, in response to determining that the user input is the instruction to execute the first recovery process;

execute the first recovery process, in response to determining that the execution condition is met; and skip the first recovery process, in response to determining that the execution condition is not met, wherein the liquid consumption in the first recovery process is the highest among a plurality of recovery processes that are selectable by the user.

10. A liquid discharge apparatus comprising:

a head including a nozzle configured to discharge a liquid, a user interface configured to accept an instruction from the user, the instruction including an indication of a selection of one of a plurality of user selectable recovery processes including at least a first recovery process and a second recovery process, and a controller configured to:

determine whether a selection of one of the plurality of user selectable recovery processes is the first recovery process or the second recovery process;

in response to determining that the first recovery process is selected, determine whether an execution condition for the first recovery process is met;

execute the first recovery process, in response to determining that the execution condition for the first recovery process is met; and skip the first recovery process, in response to determining that the execution condition for the first recovery process is not met.

* * * * *